(12) United States Patent
Vassiliou

(10) Patent No.: US 6,745,440 B2
(45) Date of Patent: Jun. 8, 2004

(54) INCREASED HOLDING POWER SPRING FASTENERS

(75) Inventor: Eustathios Vassiliou, Newark, DE (US)

(73) Assignee: Eustathios Vassiliou Revocable Trust, Newark, DE (US)

( * ) Notice: Subject to any disclaimer, the term of this patent is extended or adjusted under 35 U.S.C. 154(b) by 0 days.

(21) Appl. No.: 10/191,659

(22) Filed: Jul. 9, 2002

(65) Prior Publication Data

US 2003/0024077 A1 Feb. 6, 2003

Related U.S. Application Data

(60) Provisional application No. 60/308,921, filed on Jul. 31, 2001, and provisional application No. 60/312,867, filed on Aug. 16, 2001.

(51) Int. Cl.[7] ............................ A44B 17/00; F16L 33/00
(52) U.S. Cl. ............................. 24/295; 24/289; 24/457
(58) Field of Search .................... 24/292, 295, 457, 24/289; 411/508, 510, 913

(56) References Cited

U.S. PATENT DOCUMENTS

| | | | |
|---|---|---|---|
| 2,296,046 A | 9/1942 | Miller | 85/11 |
| 2,424,757 A | 7/1947 | Klumpp, Jr. | 174/153 |
| 2,601,803 A | 7/1952 | Newman | 85/38 |
| 2,745,308 A | 3/1956 | Gisondi | 85/13 |
| 2,825,948 A | 3/1958 | Parkin | 24/73 |
| 3,148,579 A | 9/1964 | Giovannetti | 85/83 |
| 3,486,158 A | 12/1969 | Soltysik et al. | 339/14 |
| 4,133,246 A | 1/1979 | Small | 85/80 |
| 4,354,782 A | 10/1982 | Newport | 411/61 |
| 4,431,355 A | 2/1984 | Junemann | 411/360 |
| 4,595,325 A | 6/1986 | Moran et al. | 411/173 |
| 4,609,170 A | 9/1986 | Schnabl | 248/71 |
| 4,981,310 A | 1/1991 | Belissaire | 285/162 |
| 5,092,550 A | 3/1992 | Bettini | 248/188.4 |
| 5,887,319 A | 3/1999 | Smith | 24/293 |
| 5,919,019 A | 7/1999 | Fischer | 411/182 |
| 5,987,714 A | 11/1999 | Smith | 24/295 |
| 6,141,837 A | 11/2000 | Wisniewski | 24/295 |
| 6,203,240 B1 | 3/2001 | Hironaka et al. | 403/397 |
| 6,276,644 B1 | 8/2001 | Jennings et al. | 248/49 |

Primary Examiner—Robert J. Sandy
(74) Attorney, Agent, or Firm—E. Vassiliou

(57) ABSTRACT

This invention relates to a sealing spring fasteners, which comprise one or more snapping engagement segments. The snapping engagement segments have engagement sections, which in turn have engagement bent portions. The engagement bent portions provide the sealing spring fasteners with considerably increased holding power. The invention also pertains a method of making the fasteners, as well as vehicles comprising such fasteners.

32 Claims, 3 Drawing Sheets

INCREASED HOLDING POWER SPRING FASTENERS

RELATED APPLICATIONS

This application claims priority of provisional patent application No. 60/308,921, filed on Jul. 31, 2001, and provisional patent application No. 60/312,867, filed Aug. 16, 2001, both of which are incorporated herein by reference in their entirety.

FIELD OF THE INVENTION

This invention relates to spring fasteners, and more particularly to those fasteners which are suitable to be engaged in a slot of a solid sheet.

BACKGROUND OF THE INVENTION

A number of fasteners, which are suitable to be engaged in a slot of a solid sheet, especially in the Automotive Industry, have been used in the past for securing an object on the solid sheet through the engaged fastener.

These fasteners comprise one or more engagement segments. In a first class of fasteners, the engagement segment is caused to reside under the surface of the solid sheet, in the vicinity of the slot, in order to hold the fastener secured on said solid sheet. Another object may be secured also on the fastener, with the end result to connect the object to the solid sheet.

In such an occasion, the thickness of the solid sheet and the dimensions of the engagement segment have to be designed within very strict tolerances in order to minimize lose connection of the fastener to the solid sheet. Even with the very strict tolerances, if the engagement depends only on springingly snapping the engagement segment into position, there will still be some play.

In the state of the art, a number of solutions have been proposed and utilized, which solutions however, have introduced a different problem. According to this second class of fasteners, the engagement segment comprises an insertion section and an engagement section connected by a separating bent. The engagement section does not go completely through the slot, but the surface of the engagement section is springingly forced against an edge of the slot. Therefore, any differences in the thickness of the solid sheet are accommodated by the length of the engagement section. However, the fastener may now be removed from the slot with a much lower force, than if the engagement section were forced to be all the way under the surface of the solid sheet in the vicinity of the slot.

Due to the different angles that the insertion section and the engagement sections have with respect to the direction of the insertion, it is usually easier to insert the fastener into the slot than to remove it.

Removal of the fastener is in some occasions desirable, while in some other occasions may be catastrophic for the application.

In any event, it is always desirable to have the possibility of increasing the removal force to a desired degree.

Some examples of the state of the art fasteners are disclosed in U.S. Pat. Nos. 5,987,714, 5,636,891, 5,632,584, 5,285,551, 5,249,900, 5,186,517, 4,630,338, 4,402,108, and 3,889,320, among a plurality of others.

None of the above references, however, discloses, suggests or implies the intricate and critical combinations of elements disclosed and/or claimed in the instant invention.

Non-Provisional Patent Applications Nos. 09/969,563, 09/493,476, and 10/164,493, which are incorporated herein by reference, also pertain fasteners of the above classes, and they provide solutions for miscellaneous problems.

SUMMARY OF THE INVENTION

As aforementioned, this invention relates to spring fasteners characterized by a structure suitable to be engaged in a slot. More particularly, this invention pertains a spring fastener comprising a spring fastener comprising a snapping engagement segment, the snapping engagement segment having an insertion section and an engagement section, the insertion section and the engagement section separated by a separating bent, the engagement section comprising a base and an engagement bent portion, the engagement bent portion directed away from the base at a first angle, and comprising peaks and recesses, the base having a middle portion and an edge portion.

Although the first angle may have any value, it is preferably substantially 90° or greater.

The recesses may reach the base or extend within the base with a final direction toward the middle of the base.

In one embodiment of the invention, the peaks have a front side, and a back side, and the front side being longer than the back side.

In certain occasions, it is preferable for the engagement bent portion to have only one single peak with a respective recess in the vicinity of the separating bent.

The engagement bent portion may be disposed over the edge portion of the base, or it may be disposed over any other location of the base, such as the vicinity of the middle portion of the base, for example.

This invention also pertains method of making a spring fastener, the spring fastener comprising a snapping engagement segment, the snapping engagement segment having an insertion section and an engagement section, the insertion section and the engagement section separated by a separating bent, the engagement section comprising a base and an engagement bent portion, the engagement bent portion directed away from the base at a first angle, and comprising peaks and recesses, the base having a middle portion and an edge portion;

the method comprising a step of cutting a flat blank corresponding to the spring fastener, and a step of bending to a desired angle part of the portion corresponding to the engagement section and comprising peaks and recesses, thereby forming the engagement bent portion of the engagement segment of the fastener.

Vehicles comprising the spring fastener of this invention, connecting two parts, one of the parts comprising a slot in which the fastener is secured by the snapping engagement segment, are also included within the scope of the instant invention.

DESCRIPTION OF THE DRAWING.

The reader's understanding of practical implementation of preferred embodiments of the invention will be enhanced by reference to the following detailed description taken in conjunction with perusal of the drawing figures, wherein:

FIG. 3b illustrates the top view of the fastener of FIG. 3a.

FIG. 3c illustrates the front view of the fastener of FIG. 3a.

DETAILED DESCRIPTION OF THE INVENTION

Figure 1:
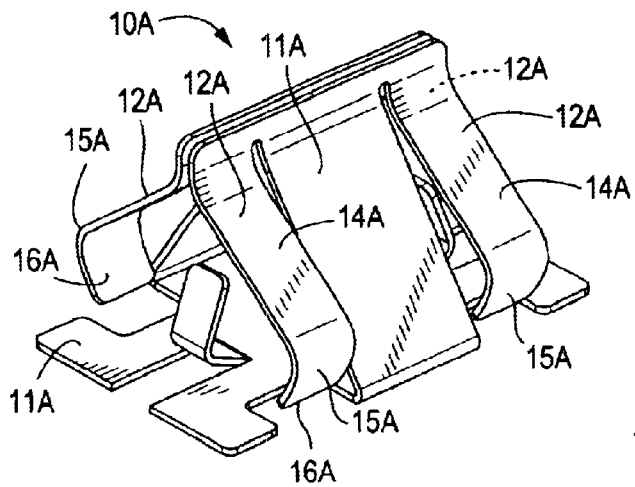
FIG. 1 illustrates a perspective view of a prior art fastener, which comprises four snapping engagement segments.

As aforementioned, this invention relates to spring fasteners characterized by a structure suitable to be engaged in a slot and secure one article on another article.

As also aforementioned, a number of fasteners, which are suitable to be engaged in a slot of a solid sheet, such as metal sheet, rigid plastic sheet, and different other types of solid sheet, especially in the Automotive Industry, have been used in the past for securing an object on the solid sheet through the engaged fastener.

These fasteners comprise one or more, and usually an even number of engagement segments. In first class of fasteners, the engagement segment is caused to reside under the surface of the solid sheet, in the vicinity of the slot, in order to hold the fastener secured on said solid sheet. Another object may be secured also on the fastener, with the end result to connect the object to the solid sheet. In such an occasion, the thickness of the solid sheet and the dimensions of the engagement segment have to be designed within very strict tolerances in order to minimize lose connection of the fastener to the solid sheet. Even with the very strict tolerances, if the engagement depends only on springingly snapping the engagement segment into position, there will still be some play.

In the state of the art, a number of solutions have been proposed and utilized, which solutions however, have introduced a different problem. According to this second class of fasteners, the engagement segment comprises an insertion section and an engagement section connected by a separation bent. The engagement section does not go completely through the slot, but the surface of the engagement section is springingly forced against an edge of the slot. Therefore, any differences in the thickness of the solid sheet are accommodated by the length of the engagement section. However, the fastener may now be removed from the slot with a much lower force, than if the engagement segment were forced to be all the way under the surface of the solid sheet in the vicinity of the slot. Due to the different angles that the insertion section and the engagement sections have with respect to the direction of the insertion, it is usually easier to insert the fastener into the slot than to remove it. Removal of the fastener is in some occasions desirable, while in some other occasions may be catastrophic for the application.

The present invention concerns mainly the second class of fasteners, wherein the engagement section does not go completely through the slot, but the surface of the engagement section is springingly forced against an edge of the slot. The engagement section according to this invention has been critically designed to considerably increase the removal force of the fastener from the slot, without substantially affecting the insertion force. Any fastener, which belongs to the second class as described above, and which fastener also comprises one or more snapping engagement segments according to this invention, is within the scope of the claims of the instant invention.

In FIG. 1, 2, and 3a, 3b, 3c, there are depicted examples of fasteners 10A of the prior art, all of which comprise a snapping engagement segment 12A. The snapping engagement segment 12A comprises an insertion section 14A and an engagement section 16A.

Figure 4:
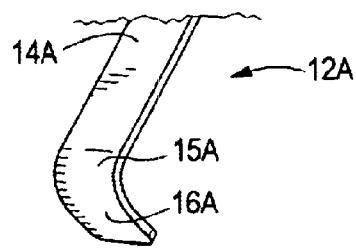
FIG. 4 illustrates a fractional perspective view of a snapping engagement segment according to the prior art.

In FIG. 4 there is depicted a an example of a fractional perspective view of a snapping engagement segment 12A, which comprises the insertion section 14A and the engagement section 16A, which are separated by the separating bent 15A.

Figure 5:
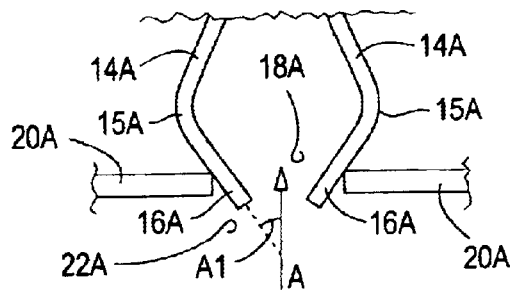
FIG. 5 illustrates two snapping segments of the prior art engaged in a slot of a solid sheet.

The operation of these fasteners is shown in FIG. 5. The fastener 10 is pushed through the slot 18A of the solid sheet 20A, from the insertion side 22A. As the fastener 10A is being pushed through the slot 18A, the insertion sections 14A are initially pushed toward each other. In sequence, and after the separating bent 15A has also been passed through the slot 18A, the fastener 10A is secured in position by the force exerted by the engagement sections 16A on the edges of the slot 18A.

The fastener 10A may be removed form the slot 18A by pulling or pushing the fastener 10A in a direction opposite to the direction it was pushed or pulled in order to be inserted. Depending on the angle A1 that the engagement section 16A has with the direction of insertion D, the force required for removal is lower or higher. The smaller the angle the smaller the force to remove the fastener, and vice versa.

Figure 6:
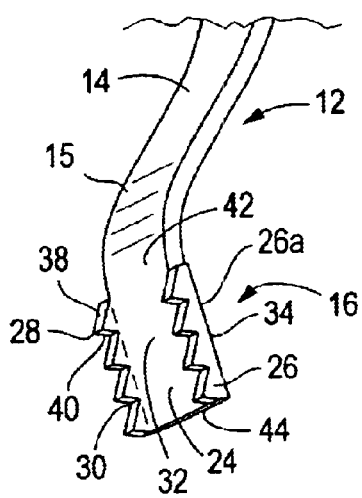
FIG. 6 illustrates a fractional perspective view of a snapping engagement segment according to one embodiment of the instant invention.

Referring now to FIG. 6, there is depicted a partial perspective view of the snapping engagement segment 12 according to an embodiment of the instant invention. The snapping engagement segment 12 comprises the insertion section 14 and the engagement section 16, which are separated by the separating bent 15.

Figure 2:
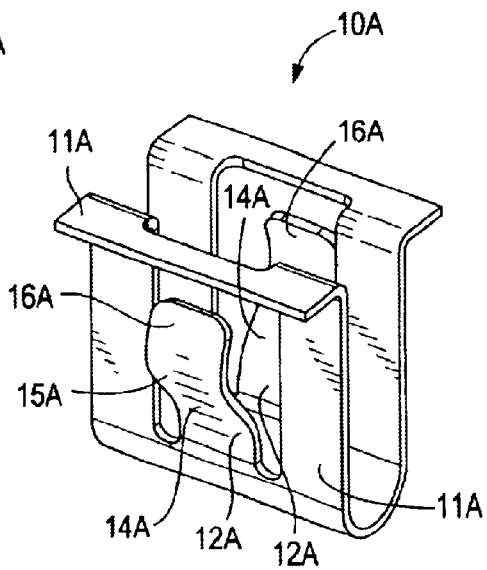
FIG. 2 illustrates a perspective view of a prior art fastener, which comprises two snapping engagement segments.
Figure 3B:
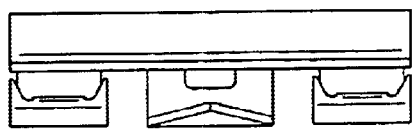
Figure 3C:
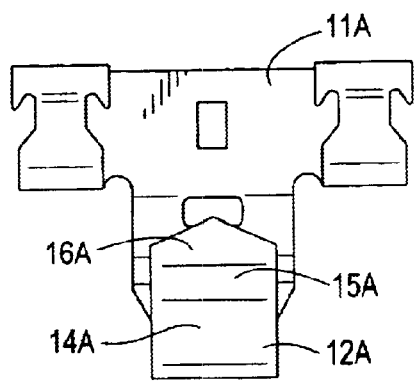
Figure 3A:
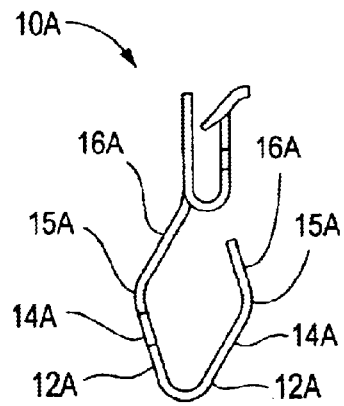
FIG. 3a illustrates a side view of another prior art fastener, which comprises also two snapping engagement segments.

It is important for the purposes of this invention that the insertion section 14 is directed, to at least some degree, away from the main body of the fastener, while the engagement section 16 is directed, to at least some degree, toward the main body of the fastener, as better illustrated in FIGS. 1, 2, and 3a, for example. This necessitates the presence of the separating bent 12, which may be sharp or gradual in order to allow the formation of the two co-operating sections.

The engagement section 16 comprises a base 24 and an engagement bent portion 26. The engagement bent portion 26 comprises peaks 28 and recesses 30. The engagement bent portion 26 is directed away from the base 24 at an angle A2, as better shown in FIGS. 12a, 12b, 12c, and 12d. The base 24 has a middle portion 32, and an edge portion 34.

Figure 7:
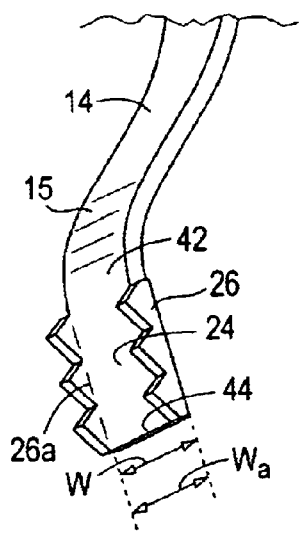
FIG. 7 illustrates a fractional perspective view of a snapping engagement segment according to another embodiment of the instant invention.
Figure 8:
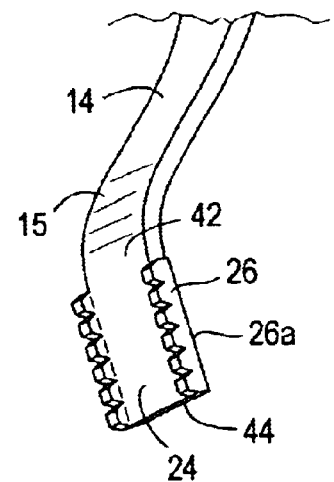
FIG. 8 illustrates a fractional perspective view of a snapping engagement segment according to another embodiment of the instant invention.

FIGS. 7, and 8 illustrate examples of different other configurations that the engagement section 16 may have.

Figure 9:
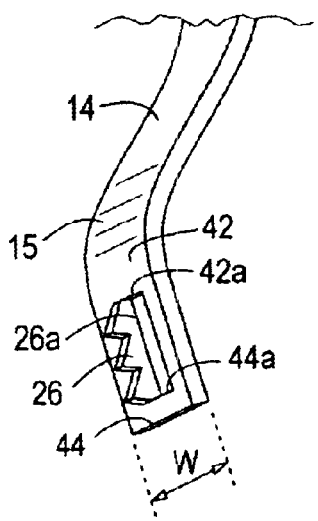
FIG. 9 illustrates a fractional perspective view of a snapping engagement segment according to another embodiment of the instant invention.
Figure 10:
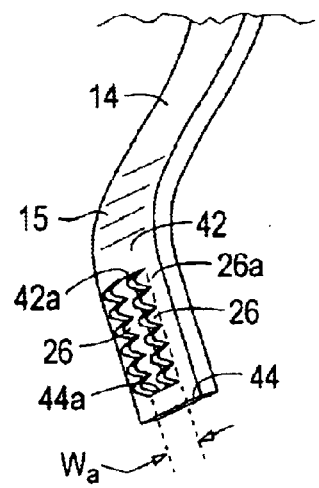
FIG. 10 illustrates a fractional perspective view of a snapping engagement segment according to another embodiment of the instant invention.

The engagement bent portions 26 may also be not only over the edges 34, but also in any place between the edge portions 34, preferably in the vicinity of the middle portion 32. Examples of such configurations are illustrated in FIGS. 9 and 10. Of course, a multiplicity of engagement bent portions 26 may also be on the base 24 of the engagement section 16, especially when the width W of the engagement section 16 is large, as for example in the type of fasteners illustrated in FIG. 3a.

The width W of the engagement section 16 may be the same as the width Wa between two consecutive engagement bents, as shown in FIG. 7, or may be larger as shown in FIG. 10. Of course, in the case of a single engagement bent 26, there exists only width W of the engagement section 16.

The engagement section 16 has a back end 42 and a front end 44. Similarly, the engagement bents have a back end 42a and a front end 44a.

The width W, as well as the width Wa, may vary to any desired degree, and independently from each other, from the back ends 42 and 42a, respectively, to the front ends 44 and 44a, respectively.

In addition, the peaks 28 may have different heights along the engagement bent portion. Similarly, the recesses 30, may have any different depths along the engagement bent portion.

Figure 11:
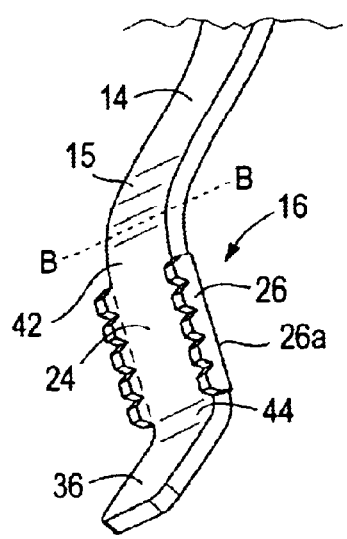
FIG. 11 illustrates a fractional perspective view of a snapping engagement segment according to another embodiment of the instant invention.

The engagement section 16 can be followed by any other section, such as extension section 36 for example, better shown in FIG. 11. Such extension sections 36 are utilized often in fasteners of the type shown in FIG. 2.

Figure 12A:
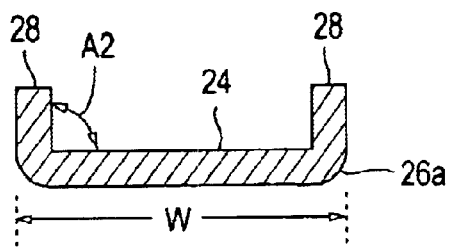
FIG. 12a illustrates a cross-sectional view of the engagement section, through a peak, wherein the engagement bent portion and the base form an angle of substantially 90°.
Figure 12B:
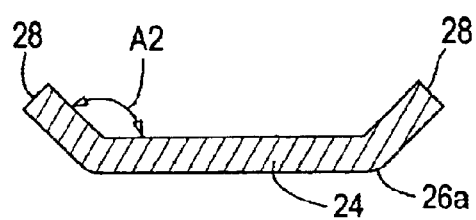
FIG. 12b illustrates a cross-sectional view of the engagement section, through a peak, wherein the engagement bent portion and the base form an angle greater than 90°.
Figure 12C:
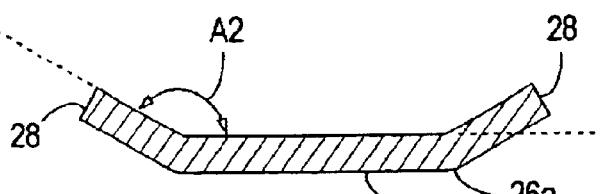
FIG. 12c illustrates another cross-sectional view of the engagement section, through a peak, wherein the engagement bent portion and the base form an angle even greater than that in case of FIG. 12b.
Figure 12D:
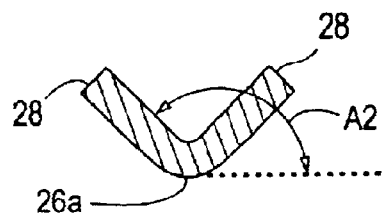
FIG. 12d illustrates another cross-sectional view of the engagement section, through a peak, wherein at least part the base has a width approaching to zero.

The angle A2 is preferably 90° or larger. FIGS. 12a, 12b, and 12c are cross sections of an engagement section 16 through peaks 28 in FIG. 6 for example They show examples of angles A2 being 90° or larger. The angle in all three cases is measured between the engagement bent portion and the solid part (not the empty space) of the engagement section 16. In the case of FIG. 12d, the angle is measured in a similar manner, if one decreases the width of the base 24 of FIG. 12c gradually until it attains a substantially zero value.

Figure 13:
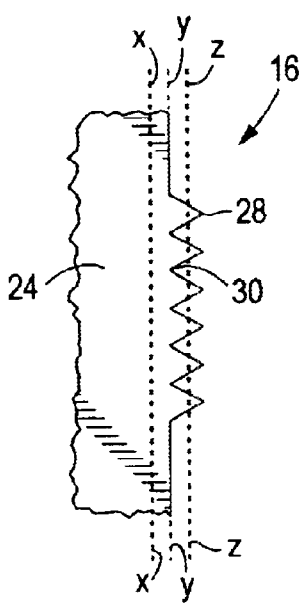
FIG. 13 illustrates the edge of a base having peaks and recesses, before bending a portion of the base to a desired angle around one of lines X—X, Y—Y, or Z—Z.

The recesses 30, preferably reach the base 24, and in some occasions they extend within the base 24. This can be better understood by considering the configuration of FIG. 13, which represents an example of an initial zigzag stamping or cutting of one side of the engagement section 16. If a bent is made through line X—X to form the engagement bent portion 26, the recesses will remain above the base 26 and they will not reach said base 26. If a bent is made through line Y—Y to form the engagement bent portion 26, the recesses will just reach the base 26. If a bent is made through line Z—Z to form the engagement bent portion 26, the recesses will not only reach the base 26, but they will also extend within the base 24.

The peaks 28 have a front side 38 and a back side 40, as better shown in FIG. 6. The front side 38 is closer to the separating bent 15 than the back side 40. It is preferable that the front side 38 is longer than the back side 40, since such a configuration increases the force needed to remove the force required to remove the fastener from a slot, as compared to the force needed to insert the fastener into the same slot.

The engagement bent portions 26 may have any direction on the engagement sections 24. Further, the edge portions 34 are not required to be parallel to each other, but they may have any direction desired, independent from each other.

The direction B—B of the separating bent 15 is preferably substantially perpendicular to the insertion section 14, as illustrated in FIG. 11, for example.

In summary, the fastener of the present invention comprises a main body 11, not shown but illustrated by the main body 11A of the prior art as shown in FIGS. 1, 2, and 3c. The fastener also comprises a snapping engagement segment 12 (FIG. 6, for example) corresponding to the snapping segments 12A of the prior art (FIGS. 1–4). The snapping engagement segment 12 of the present invention has a separating bent 15, an insertion section 14 connected to the main body 11 of the spring fastener 10, which insertion section 14 extends away from said main body 11 of the spring fastener 10, and an engagement section 16. The insertion section 14 and the engagement section 16 are connected to each other at the separating bent 15. The engagement section 16 has a front end 44 and a back end 42, neither one of which is connected to the main body 11. Further, the engagement section 16 extends toward said main body 11 of the spring fastener 10. The direction B—B of the separating bent 15 is preferably substantially perpendicular to the direction of the insertion section 14, as illustrated in FIG. 11, for example. The engagement section 16 comprises an engagement bent 26a, a base 24, and an engagement bent portion 26. The base 24 and the engagement bent portion 26 are connected to each other at the engagement bent 26a, the engagement bent 26a is non-parallel to the separating bent 15. The engagement bent portion 26 directed away from the base 24 at a first angle A2, and comprises peaks 28 and recesses 30. The base 24 has a middle portion 32 and an edge portion 34.

Figure 14:
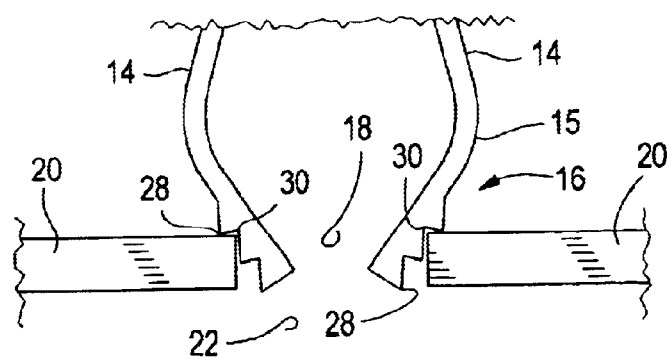
FIG. 14 illustrates two snapping segments of a fastener engaged in a slot of a solid sheet according to the present invention.

The operation of the fasteners of the present invention is shown in FIG. 14. The fastener 10 is pushed through the slot 18 of the solid sheet 20, from the insertion side 22. As the fastener 10 is being pushed through the slot 18, the insertion sections 14 are initially pushed toward each other. In sequence, and after the separating bent 15 has also been passed through the slot 18, the fastener 10 is secured in position by the force exerted by the engagement sections 16 on the edges of the slot 18, greatly increased by the peaks 28 and recesses 30 of the engagement sections 16, as compared to a case wherein the engagement bent portions were absent.

The fasteners of the instant invention may have only a single peak with a respective recess. Especially in the case, where it is desirable to increase the holding power of the fastener to just a certain desirable degree only, the respective single recess may have a gradual slope, as shown for example in FIG. 5A of non-provisional patent application No. 10/164,963, filed Jun. 7, 2002, which is incorporated herein by reference.

Vehicles comprising the spring fastener of this invention, connecting two parts, one of the parts comprising a slot in which the fastener is secured by the snapping engagement segment, are also included within the scope of the instant invention.

As aforementioned, the present invention also relates to a method of making the fasteners of this invention. This method, in addition to other steps known to the art, also comprises a step of (after cutting a flat blank corresponding to the spring fastener) bending to a desired angle part of the portion corresponding to the engagement section which comprises peaks and recesses, thereby forming the engagement bent portion of the engagement segment of the fastener.

The fasteners of the instant invention may be provided with an elastic body and/or extremities as described in U.S. Pat. No. 6,353,981 B1 (Smith) which is incorporated herein by reference.

Automobiles or other vehicles may be made, comprising one or more of the fasteners of the instant invention, providing substantial improvements regarding safety, performance and comfort.

Examples of embodiments demonstrating the operation of the instant invention, have now been given for illustration purposes only, and should not be construed as restricting the scope or limits of this invention in any way.

Any explanations given are speculative and should not restrict the scope of the claims.

What is claimed is:

1. A spring fastener comprising a main body and a snapping engagement segment, the snapping engagement segment having a separating bent, an insertion section connected to the main body of the spring fastener and extending away from said main body of the spring fastener, and an engagement section, the insertion section and the engagement section being connected to each other at the separating bent, the engagement section having a front end and a back end neither end being connected to the main body, said engagement section extending toward said main body of the spring fastener, the separating bent being substantially perpendicular to the direction of the insertion section, the engagement section comprising an engagement bent, a base and an engagement bent portion, the base and the engagement bent portion connected to each other at the engagement bent, the engagement bent being non-parallel to the separating bent, the engagement bent portion directed away from the base at a first angle, and comprising peaks and recesses, the base having a middle portion and an edge portion.

2. A spring fastener as defined in claim 1, wherein the first angle is substantially 90°.

3. A spring fastener as defined in claim 1, wherein the first angle is greater than 90°.

4. A spring fastener as defined in claim 1, wherein the recesses reach the base or extend within the base.

5. A spring fastener as defined in claim 2, wherein the recesses reach the base or extend within the base.

6. A spring fastener as defined in claim 3, wherein the recesses reach the base or extend within the base.

7. A spring fastener as defined in claim 1, wherein the peaks have a front side and a back side, the front side being longer than the back side.

8. A spring fastener as defined in claim 2, wherein the peaks have a front side and a back side, the front side being longer than the back side.

9. A spring fastener as defined in claim 3, wherein the peaks have a front side and a back side, the front side being longer than the back side.

10. A spring fastener as defined in claim 1, wherein the engagement bent portion is disposed over the edge portion of the base.

11. A spring fastener as defined in claim 2, wherein the engagement bent portion is disposed over the edge portion of the base.

12. A spring fastener as defined in claim 3, wherein the engagement bent portion is disposed over the edge portion of the base.

13. A spring fastener as defined in claim 1, wherein the engagement bent portion is disposed in the vicinity of the middle portion of the base.

14. A spring fastener as defined in claim 2, wherein the engagement bent portion is disposed in the vicinity of the middle portion of the base.

15. A spring fastener as defined in claim 3, wherein the engagement bent portion is disposed in the vicinity of the middle portion of the base.

16. A spring fastener as defined in claim 3, wherein each of the bent portions has only one peak with a respective recess in the vicinity of the separating bent.

17. A vehicle comprising a spring fastener connecting two parts, one of the parts comprising a slot in which the fastener is secured, the fastener comprising a main body and a snapping engagement segment, the snapping engagement segment having a separating bent, an insertion section connected to the main body of the spring fastener and extending away from said main body of the spring fastener, and an engagement section, the insertion section and the engagement section being connected to each other at the separating bent, the engagement section having a front end and a back end, neither end being connected to the main body, said engagement section extending toward said main body of the spring fastener, the engagement section comprising an engagement bent, a base and an engagement bent portion, the base and the engagement bent portion connected to each other at the engagement bent, the engagement bent being non-parallel to the separating bent, the engagement bent portion directed away from the base at a first angle, and comprising peaks and recesses, the base having a middle portion and an edge portion.

18. A vehicle as defined in claim 17, wherein the first angle is substantially 90°.

19. A vehicle as defined in claim 17, wherein the first angle is greater than 90°.

20. A vehicle as defined in claim 17, wherein the recesses reach the base or extend within the base.

21. A vehicle as defined in claim 18, wherein the recesses reach the base or extend within the base.

22. A vehicle as defined in claim 19, wherein the recesses reach the base or extend within the base.

23. A vehicle as defined in claim 17, wherein the peaks have a front side and a back side, the front side being longer than the back side.

24. A vehicle as defined in claim 18, wherein the peaks have a front side and a back side, the front side being longer than the back side.

25. A vehicle as defined in claim 19, wherein the peaks have a front side and a back side, the front side being longer than the back side.

26. A vehicle as defined in claim 17, wherein the engagement bent portion is disposed over the edge portion of the base.

27. A vehicle as defined in claim 18, wherein the engagement bent portion is disposed over the edge portion of the base.

28. A vehicle as defined in claim 19, wherein the engagement bent portion is disposed over the edge portion of the base.

29. A vehicle as defined in claim 17, wherein the engagement bent portion is disposed in the vicinity of the middle portion of the base.

30. A vehicle as defined in claim 18, wherein the engagement bent portion is disposed in the vicinity of the middle portion of the base.

31. A vehicle as defined in claim 19, wherein the engagement bent portion is disposed in the vicinity of the middle portion of the base.

32. A vehicle as defined in claim 17, wherein each of the bent portions has only one peak with a respective recess in the vicinity of the separating bent.

* * * * *